United States Patent
Antaya et al.

(10) Patent No.: US 9,861,913 B2
(45) Date of Patent: Jan. 9, 2018

(54) CENTRIFUGAL SEPARATOR

(71) Applicants: Robert Antaya, Rochester Hills, MI (US); Richard Bovensiep, Troy, MI (US)

(72) Inventors: Robert Antaya, Rochester Hills, MI (US); Richard Bovensiep, Troy, MI (US)

( * ) Notice: Subject to any disclaimer, the term of this patent is extended or adjusted under 35 U.S.C. 154(b) by 604 days.

(21) Appl. No.: 14/278,612

(22) Filed: May 15, 2014

(65) Prior Publication Data

US 2015/0328567 A1  Nov. 19, 2015

(51) Int. Cl.
| | |
|---|---|
| *B01D 21/26* | (2006.01) |
| *B04C 5/103* | (2006.01) |
| *B04C 5/13* | (2006.01) |
| *B04C 5/04* | (2006.01) |
| *B01D 21/00* | (2006.01) |

(52) U.S. Cl.
CPC ....... *B01D 21/267* (2013.01); *B01D 21/0042* (2013.01); *B01D 21/262* (2013.01); *B04C 5/04* (2013.01); *B04C 5/103* (2013.01); *B04C 5/13* (2013.01); *B04C 2005/136* (2013.01)

(58) Field of Classification Search
CPC  B01D 21/0042; B01D 21/262; B01D 21/267; B04C 5/04; B04C 5/13; B04C 5/12; B04C 5/103; B04C 5/181; B04C 5/107; B04C 2005/136

See application file for complete search history.

(56) References Cited

U.S. PATENT DOCUMENTS

| | | | | |
|---|---|---|---|---|
| 1,055,792 | A * | 3/1913 | Plock | B04C 5/103 55/392 |
| 1,753,502 | A * | 4/1930 | Clark | B04C 5/12 55/340 |
| 2,010,128 | A * | 8/1935 | Arnold | B04C 5/04 209/710 |
| 2,667,944 | A * | 2/1954 | Crites | B04C 5/06 55/346 |
| 4,298,465 | A * | 11/1981 | Druffel | B01D 17/0211 210/304 |
| 4,305,825 | A * | 12/1981 | Laval, Jr. | B04C 5/103 209/727 |
| 5,078,875 | A * | 1/1992 | Losing | B01D 17/0208 210/295 |

(Continued)

*Primary Examiner* — David C Mellon
(74) *Attorney, Agent, or Firm* — Patent Service Associates; Lyman Smith

(57) ABSTRACT

A separator provides mechanical separation of suspended particles or debris within a fluid. The separator includes a cylindrical body having an inlet pipe for directing the fluid generally tangentially into the cylindrical body, causing the fluid to spin around the inside diameter of the cylindrical body. An outlet pipe, having an outer diameter smaller than the inside diameter of the cylindrical body, can extend from a top end of the cylindrical body into the cylindrical body. Directional blades can be disposed on an outer surface of the outlet pipe, with a gap between the directional blades and the inside surface of the cylindrical body. A baffle dome disposed an a lower end of the cylindrical body slows down the fluid flow, causing the particles and debris to remain below the baffle and settle. The fluid then exits out the outlet pipe as a cleaned fluid.

18 Claims, 4 Drawing Sheets

(56) References Cited

U.S. PATENT DOCUMENTS

| | | | |
|---|---|---|---|
| 6,440,197 B1* | 8/2002 | Conrad | A47L 9/1608 55/418 |
| 7,288,202 B2* | 10/2007 | Maier | B01D 45/14 209/719 |
| 2008/0115469 A1* | 5/2008 | Lane | B01D 45/06 55/337 |
| 2013/0199137 A1* | 8/2013 | Hallgren | B01D 45/16 55/393 |

* cited by examiner

CENTRIFUGAL SEPARATOR

BACKGROUND OF THE INVENTION

The present invention relates to centrifugal separators and, more particularly, to a centrifugal separator having a set of directional blades for preventing fluid entering the separator from taking the path of least resistance down the inside of the body while maintaining the spinning of the fluid.

It is often desirable to separate solid particles from liquid/solid mixtures or slurries to clarify or purify the remaining liquid. When significant quantities of solids are present, it is impractical to use mesh filters since they will quickly clog and be rendered useless. As a result, cyclonic, centrifugal liquid-solid separators have been developed.

Cyclonic separation is a method of removing particulates from an air, gas or liquid stream, without the use of filters, through vortex separation. Rotational effects and gravity are used to separate mixtures of solids and fluids.

A high speed rotating flow is established within a cylindrical or conical container. Air flows in a helical pattern, typically beginning at the top of the separator and ending at the bottom end before exiting the separator in a stream through the center of the cyclone and out the top.

These separators utilize centrifugal force and gravity to achieve varying degrees of separation of solids from solid/liquid mixtures. The separated solids generally settle to the bottom of the centrifugal chamber from which they are periodically removed.

As can be seen, there is a need for an improved centrifugal separator that can effectively separate particles and debris from a fluid.

SUMMARY OF THE INVENTION

In one aspect of the present invention, a separator comprises a cylindrical body; an inlet port delivering a fluid into the cylindrical body generally tangential to an inside surface of the cylindrical body; an outlet port disposed at a top of the separator; a discharge pipe extending from the outlet port and into the cylindrical body; and blades disposed spirally along an outer surface of the discharge pipe, where a gap is formed between an outer periphery of the blades and the inside surface of the cylindrical body.

In another aspect of the present invention, a separator comprises a cylindrical body; an inlet port delivering a fluid into the cylindrical body generally tangential to an inside surface of the cylindrical body; an outlet port disposed at a top of the separator; a discharge pipe extending from the outlet port and into the cylindrical body; blades disposed spirally along an outer surface of the discharge pipe, where a gap is formed between an outer periphery of the blades and the inside surface of the cylindrical body; a reduction baffle disposed within the inlet port for increasing velocity of fluid introduced into the cylindrical body; a baffle dome disposed at a lower portion of the cylindrical body, wherein the discharge pipe extends toward the baffle dome and is separated from the baffle dome by a distance from about 10% to about 100% of a diameter of the cylindrical body; and flow straightening veins disposed in the discharge pipe for straightening a flow of cleaned fluid therethrough.

In a further aspect of the present invention, a method for separating particles from a fluid stream comprises delivering the fluid stream through an inlet port into a cylindrical body of a separator generally tangential to an inside surface thereof; spinning the fluid about a discharge pipe disposed inside the cylindrical body, the discharge pipe having blades disposed spirally along an outer surface thereof; allowing particles to flow down the inside surface through a gap formed between an outer periphery of the blades and the inside surface of the cylindrical body; and directing a cleaned fluid stream up through the discharge pipe and out an outlet port disposed at a top of the separator.

These and other features, aspects and advantages of the present invention will become better understood with reference to the following drawings, description and claims.

DETAILED DESCRIPTION OF THE INVENTION

Figure 1:
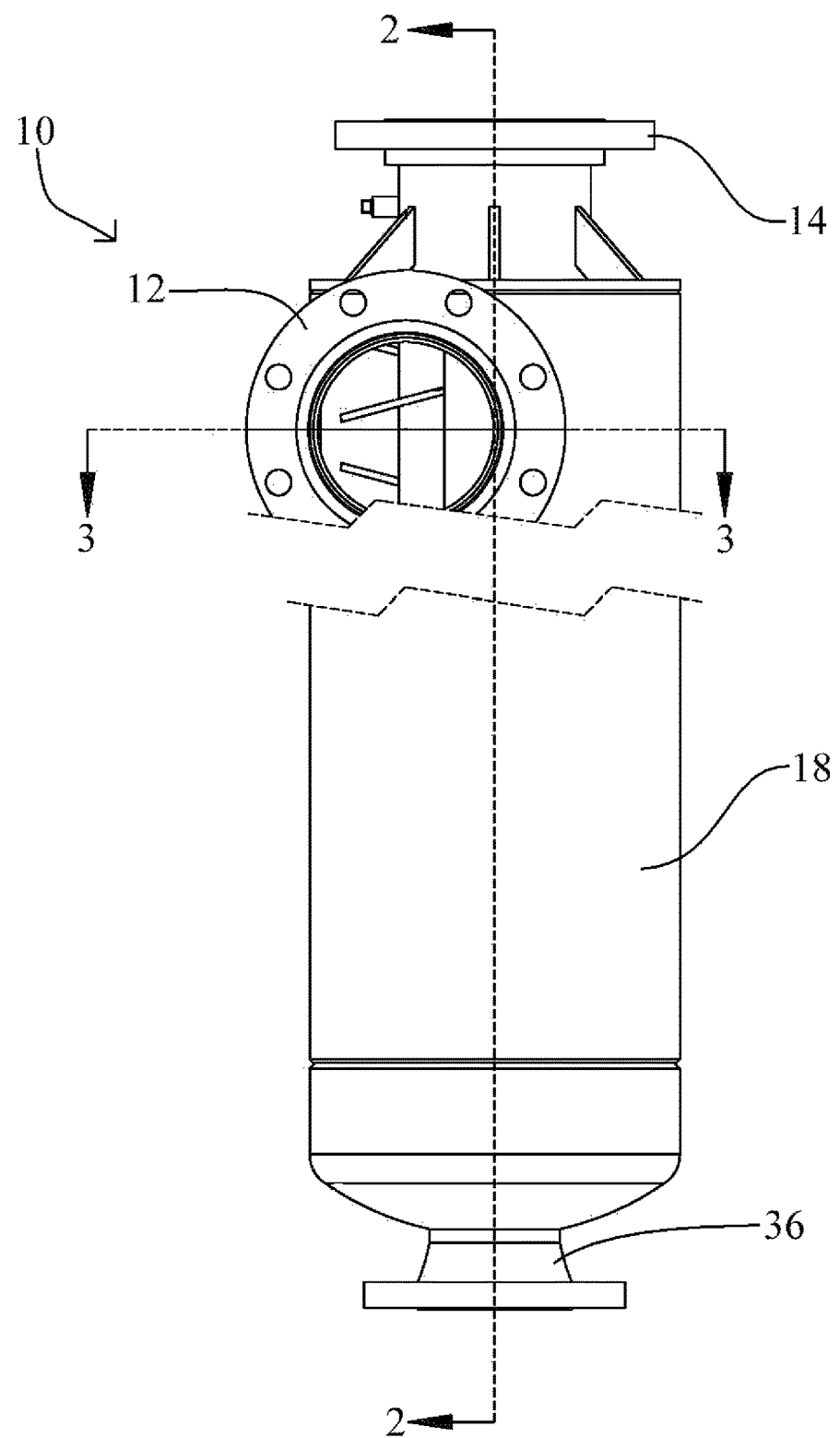
FIG. 1 is a front view of a centrifugal separator according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a separator that provides mechanical separation of suspended particles or debris within a fluid, such as a liquid, for example. The separator includes a cylindrical body having an inlet pipe for directing the fluid generally tangentially into the cylindrical body, causing the fluid to spin around the inside diameter of the cylindrical body. An outlet pipe, having a diameter smaller than the inside diameter of the cylindrical body, can extend with a first end outside a top end of the cylindrical body and a second end extending, generally concentrically, into the cylindrical body. Directional blades can be disposed on an outer surface of the outlet pipe, with a gap between the directional blades and the inside surface of the cylindrical body. A baffle dome disposed on a lower end of the cylindrical body slows down the fluid flow, causing the particles and debris to remain below the baffle and settle. The fluid then exits out the outlet pipe as a cleaned fluid.

Referring to FIGS. 1 through 5, a separator 10 can include an inlet port 12 and an outlet port 14. Fluid can be received into the inlet port 12. A reduction baffle 16 can be disposed within the inlet port 12 to reduce the size of the inlet port 12, causing an increase in fluid velocity. The reduction baffle 16 can be sized and shaped in various manners, depending on the specific application. In some embodiments, the reduction baffle 16 can be adjustable to help optimize the velocity of the fluid entering a body 18 of the separator 10. The inlet port 12 and the outlet port 14 can be flanged, threaded, grooved, or the like, for connection to flow inlets and flow outlets of an overall fluid processing system.

The inlet port 12 is attached to the body 18 of the separator 10 in such a way that the fluid flow is introduced at an angle that is generally tangential to an inside wall 20 of the body 18.

The outlet port 14 is connected to a discharge pipe 22. The discharge pipe 22 extends from the outlet port 14, into the body 18 of the separator 10. The outside diameter of the discharge pipe 22 is smaller than the inside diameter of the body 18 of the separator 10. Typically, a three nominal pipe diameter difference is used between the body 18 of the separator 10 and the discharge pipe 22 for body sizes of 10 inches or less. When the body size is greater than 10 inches, the body 18 may be shortened (reducing the number of spins) or there may be a four nominal pipe diameter difference between the body 18 and the discharge pipe 22. For example, if the body 18 of the separator 10 is formed from 6-inch pipe, the discharge pipe 22 can be sized from 3-inch pipe. Nominal pipe diameters include ½-inch, ¾-inch, 1-inch, 1.25-inch, 1.5-inch, 2-inch, 3-inch, 4-inch, 5-inch, 6-inch, 8-inch, 10-inch and the like. Of course, depending upon the specific application, the difference in sizes between the discharge pipe 22 and the body 18 of the separator 10 can be greater or less than three nominal pipe sizes.

Fluid entering the inlet port 12 spins about the inside wall 20 of the separator 10. A plurality of blades 24 can be attached to the discharge pipe 22 and extend outward therefrom toward the inside wall 20 of the body 18. The blades 24 can prevent fluid from taking the path of least resistance down the inside of the body while maintaining the spinning of the fluid. This spinning uses centrifugal force to direct particles or debris to the inside wall 20, where fluid velocity is faster.

A gap 26 can be maintained between the blades 24 and the inside wall 20. The gap 26 can be from about ¼ to about 1 inch, typically about ½ inch. The gap 26 can allow large particles to migrate down the inside wall 20 of the body 18.

The blades 24 can be disposed on opposite sides of the discharge pipe 22, with a blade gap 28 formed along the course of the blades 24. In other words, the blades 24 can form a discontinuous spiral along a length of the discharge pipe 22. However, in some embodiments, the blades 24 may be formed in a continuous spiral along the discharge pipe 22. The blades 24 can be disposed at an angle relative to a longitudinal axis of the discharge pipe 22. This angle can be from about 5 to about 25 degrees, typically about 15 degrees.

Figure 2:
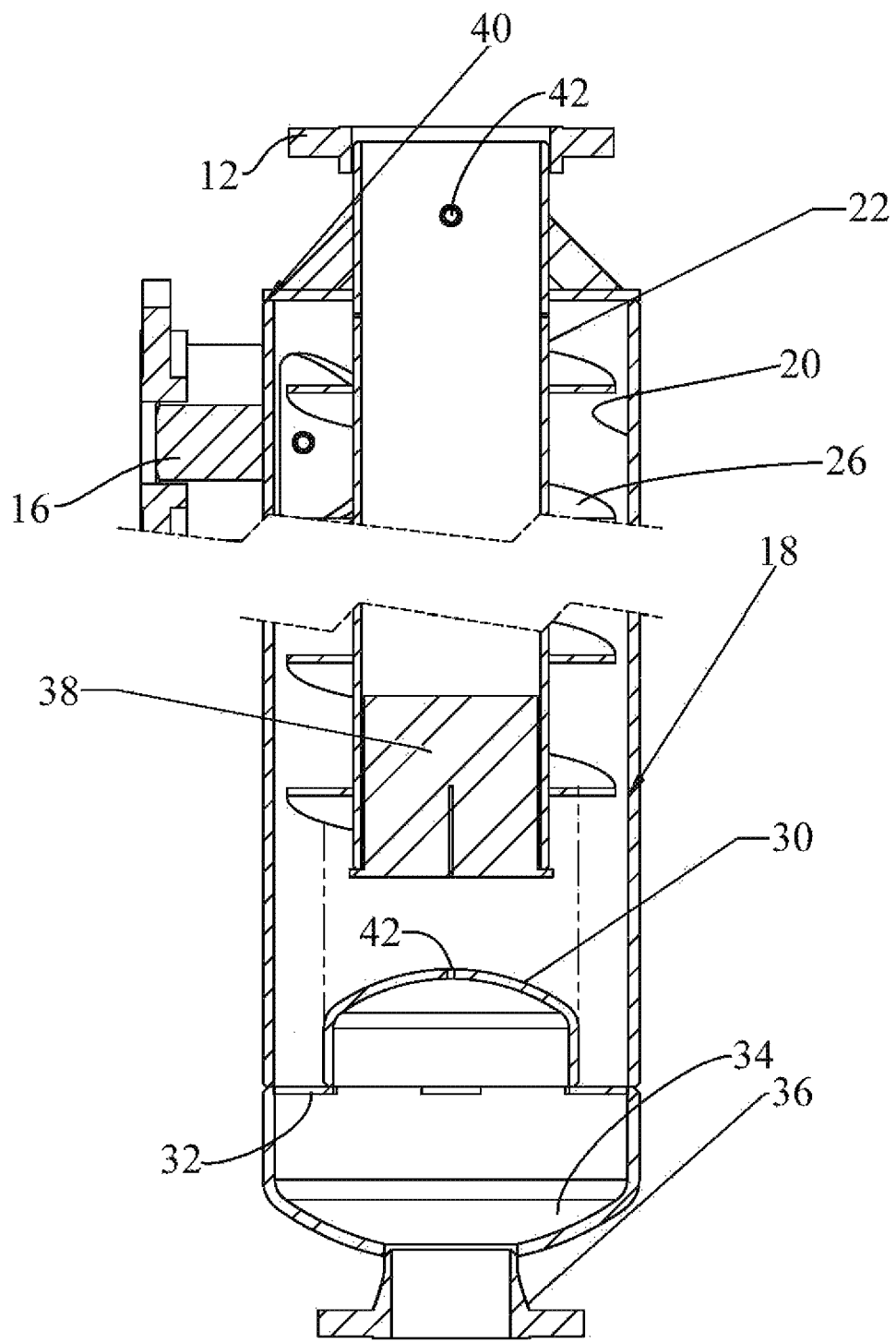
FIG. 2 is a cross-sectional view taken along line 2-2 of FIG. 1.
Figure 3:
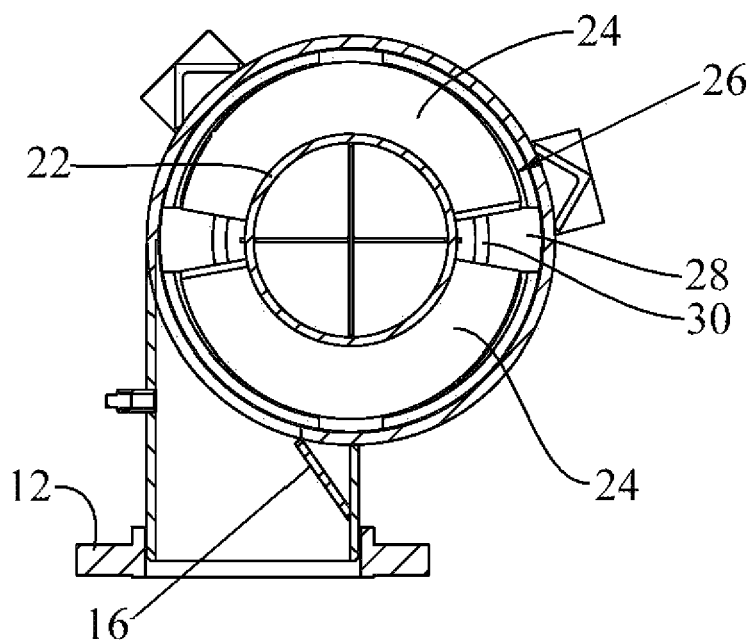
FIG. 3 is a cross-sectional view taken along line 3-3 of FIG. 1.
Figure 4:
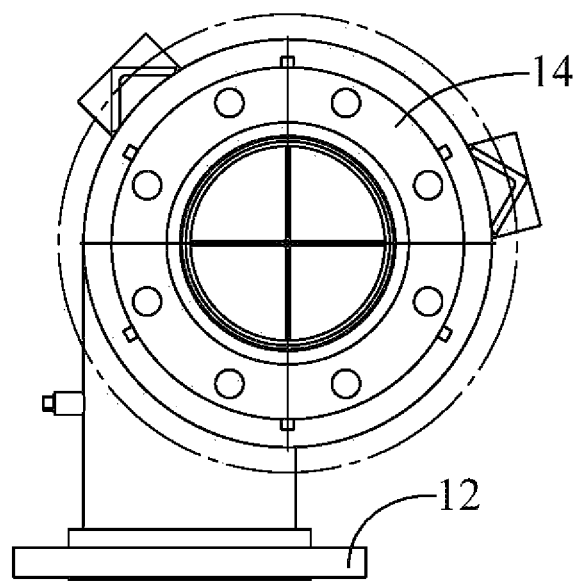
FIG. 4 is a top view of the centrifugal separator of FIG. 1.
Figure 5:
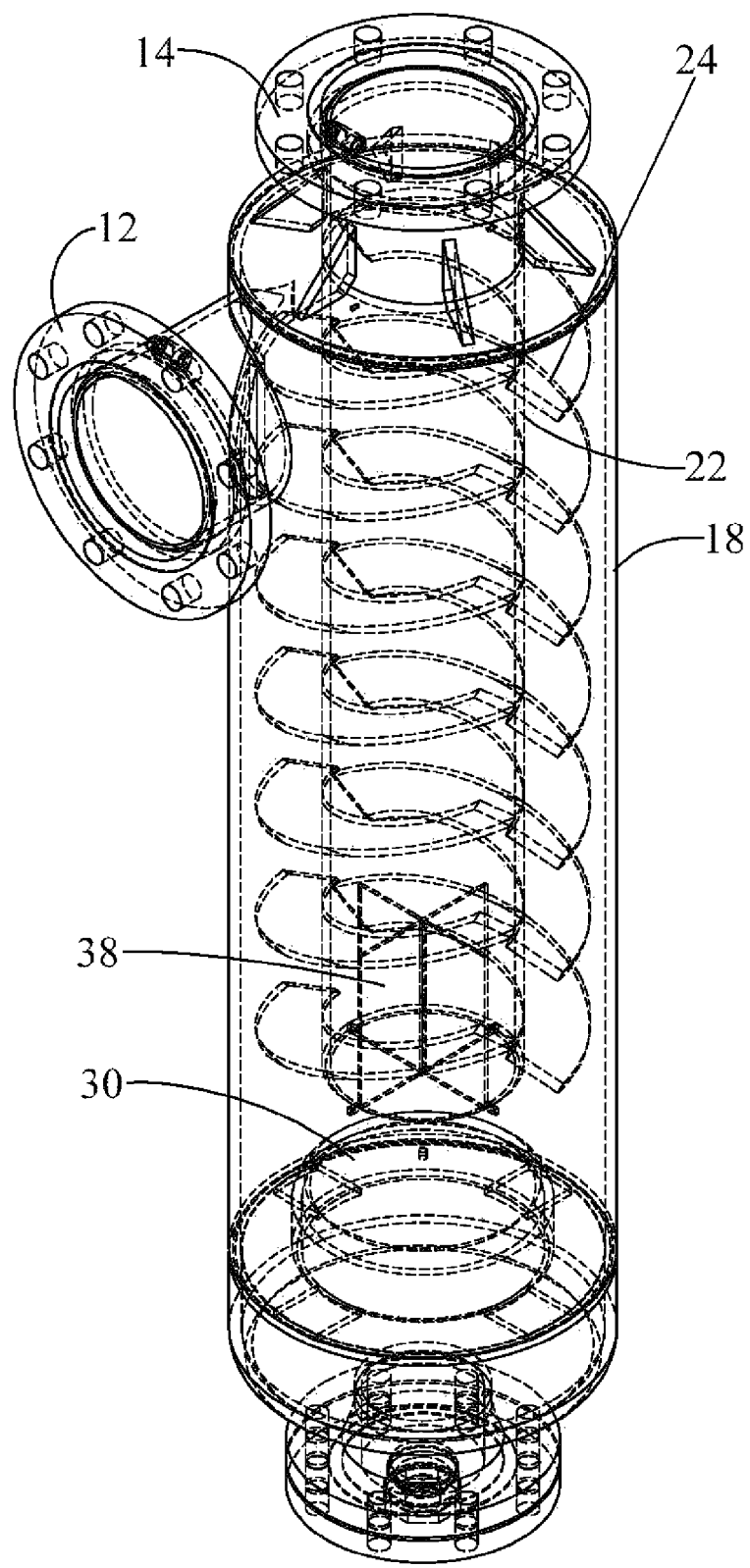
FIG. 5 is a partially cut-away perspective view of the centrifugal separator of FIG. 1.

As shown best in FIG. 2, the discharge pipe 22 can terminate above a baffle dome 30 disposed at a bottom of the body 18. Typically, the discharge pipe 22 can terminate a distance from about 10% to about 100% of the diameter of the body 18 away from the top of the baffle dome 30. The baffle dome 30 can have a diameter greater than a diameter of the discharge pipe 22, but smaller than a diameter defined by an outer edge of the blades 24. FIG. 2 shows, for example, the baffle dome 30 having a diameter formed from a midpoint of the blades 24. In some embodiments, the baffle dome 30 can have a diameter that is two nominal pipe sizes larger in diameter from the discharge pipe 22. Of course, the diameter and height of the baffle dome 30 can vary depending on application. A plurality of legs 32, typically four legs 32, can extend from the inside wall 20 of the body 18 to the bottom of the baffle dome 20. Spaces between the legs 32 allow particles and debris to fall to a collection zone 34 of the separator 10. The collection zone 34 may be formed in a frusto-conical shape to guide particles and debris to a drain 36 at the bottom of the separator 10.

When the faster fluid is carried down the body 18 below the baffle dome 30, it slows down, causing the particles and debris to remain the baffle dome 30 and settle. The drain 36 can be purged as needed to remove particles and debris from the separator 10. Slower, cleaner fluid is allowed to exit the separator 10 through the discharge pipe 22 above the baffle dome 30.

When the slower, cleaner fluid enters the discharge pipe 22, it can encounter one or more flow straightening veins 38. The straightening veins 38 can be disposed within the discharge pipe 22, typically at a bottom, open end thereof. The straightening veins 38 can be formed in various sizes and shapes and can extend various lengths into the discharge pipe 22. In one embodiment, the straightening veins 38 can be formed as two planar members, disposed orthogonally to one another within the discharge pipe 22, extending about one pipe diameter (of the discharge pipe 22) into the discharge pipe 22. The straightening veins 38 can prevent spinning of fluid entering the discharge pipe 22, allowing a straight flow to be achieved.

The discharge pipe 22 can exit the separator 10 at a top portion thereof. In some embodiments, a low profile cap 40 can be disposed at a top portion of the body 18, where the discharge pipe 22 exits. This low profile cap 40 can reduce or eliminate dead space above where the fluid flow enters the separator 10 at the inlet port 12. Of course, other shapes may be used for the top cap in place of the low profile cap 40. For example, a rounded or angled cap may be used at this location.

In some embodiments, the separator 10 may be used for cleaning a liquid stream. In this embodiment, a vent hole 42 may be disposed at a top portion of the baffle dome 30 as well as at a top of the discharge pipe 22, prior to the outlet port 14. The vent hole 42 may help purge trapped air that may enter the separator 10.

It should be understood, of course, that the foregoing relates to exemplary embodiments of the invention and that modifications may be made without departing from the spirit and scope of the invention as set forth in the following claims.

What is claimed is:

1. A separator comprising:
   a cylindrical body;
   an inlet port delivering a fluid into the cylindrical body generally tangential to an inside surface of the cylindrical body;
   an outlet port disposed at a top of the separator;
   a discharge pipe extending from the outlet port and into the cylindrical body; and
   blades disposed spirally along an entire length of, and extending directly from an outer surface of the discharge pipe, where a gap is formed, without any intervening structure, between an outer periphery of the blades and the inside surface of the cylindrical body.

2. The separator of claim 1, wherein the blades form a discontinuous spiral about the discharge pipe.

3. The separator of claim 1, further comprising a reduction baffle disposed within the inlet port for increasing velocity of fluid introduced into the cylindrical body.

4. The separator of claim 1, wherein the blades are angled from about 5 to about 25 degrees relative to a longitudinal axis of the discharge pipe.

5. The separator of claim 1, further comprising a dome-shaped baffle disposed at a lower portion of the cylindrical body.

6. The separator of claim 5, wherein the discharge pipe extends toward the dome-shaped baffle and is separated from the dome-shaped baffle by a distance from about 10% to about 100% of a diameter of the cylindrical body.

7. The separator of claim 1, further comprising a drain at a bottom end of the separator, the drain allowing removal of particles and debris separated from fluid introduced into the separator.

8. The separator of claim 1, further comprising flow straightening vanes disposed in the discharge pipe for straightening a flow of cleaned fluid therethrough.

9. The separator of claim 1, further comprising a cap disposed on a top portion of the separator, the discharge pipe extending through the cap.

10. The separator of claim 1, wherein the cylindrical body has a size that is three nominal pipe sizes larger than the discharge pipe.

11. The separator of claim 5, further comprising a vent hole disposed on a top portion of the dome-shaped baffle.

12. The separator of claim 1, further comprising a vent hole disposed on the discharge pipe adjacent the outlet port.

13. A separator comprising:
  a cylindrical body;
  an inlet port delivering a fluid into the cylindrical body generally tangential to an inside surface of the cylindrical body;
  an outlet port disposed at a top of the separator;
  a discharge pipe extending from the outlet port and into the cylindrical body;
  blades disposed spirally along an entire length of, and extending directly from an outer surface of the discharge pipe, where a gap is formed, without any intervening structure, between an outer periphery of the blades and the inside surface of the cylindrical body;
  a reduction baffle disposed within the inlet port for increasing velocity of fluid introduced into the cylindrical body;
  a baffle disposed at a lower portion of the cylindrical body, wherein the discharge pipe extends toward the baffle and is separated from the baffle by a distance from about 10% to about 100% of a diameter of the cylindrical body; and
  flow straightening vanes disposed in the discharge pipe for straightening a flow of cleaned fluid therethrough.

14. The separator of claim 13, wherein the blades form a discontinuous spiral about the discharge pipe.

15. The separator of claim 13, wherein the blades are angled from about 5 to about 25 degrees relative to a longitudinal axis of the discharge pipe.

16. The separator of claim 13, wherein the cylindrical body has a size that is three nominal pipe sizes larger than the discharge pipe.

17. A method for separating particles from a fluid stream, comprising:
  delivering the fluid stream through an inlet port into a cylindrical body of a separator generally tangential to an inside surface thereof;
  spinning the fluid about a discharge pipe disposed inside the cylindrical body, the discharge pipe having blades disposed spirally along an entire length of, and extending directly from an outer surface thereof;
  allowing particles to flow down the inside surface through a gap formed, without any intervening structure, between an outer periphery of the blades and the inside surface of the cylindrical body; and
  directing a cleaned fluid stream up through the discharge pipe and out an outlet port disposed at a top of the separator.

18. The method of claim 17, further comprising slowing the fluid stream inside the cylindrical body with a baffle disposed at a lower portion of the cylindrical body, wherein the discharge pipe extends toward the baffle and is separated from the baffle by a distance from about 10% to about 100% of a diameter of the cylindrical body.

* * * * *